United States Patent
Wang et al.

(10) Patent No.: US 8,683,957 B2
(45) Date of Patent: Apr. 1, 2014

(54) MOVEMENT ANALYSIS DEVICE FOR RODENTS

(75) Inventors: Kyu-Chang Wang, Seoul (KR); Sun-Ha Paek, Seoul (KR); Byung-Woo Yoon, Seoul (KR); Se-Pil Park, Seoul (KR); Do-Hun Lee, Gwangmyeong-si (KR)

(73) Assignee: Seoul National University Industry Foundation, Seoul (KR)

( * ) Notice: Subject to any disclaimer, the term of this patent is extended or adjusted under 35 U.S.C. 154(b) by 1272 days.

(21) Appl. No.: 11/992,474

(22) PCT Filed: Mar. 13, 2007

(86) PCT No.: PCT/KR2007/001222
§ 371 (c)(1),
(2), (4) Date: Mar. 24, 2008

(87) PCT Pub. No.: WO2007/108599
PCT Pub. Date: Sep. 27, 2007

(65) Prior Publication Data
US 2010/0218729 A1    Sep. 2, 2010

(30) Foreign Application Priority Data
Mar. 20, 2006   (KR) .................... 10-2006-0025216

(51) Int. Cl.
*A01K 1/03* (2006.01)
(52) U.S. Cl.
USPC .......................................... 119/421; 119/417
(58) Field of Classification Search
USPC ..................... 119/416, 417, 421; 43/58, 61
See application file for complete search history.

(56) References Cited

U.S. PATENT DOCUMENTS

| | | | | | |
|---|---|---|---|---|---|
| 2,532,083 | A | * | 11/1950 | Brenner | 217/62 |
| 3,362,564 | A | * | 1/1968 | Mueller | 220/345.3 |
| 3,973,522 | A | | 8/1976 | Rosow | |
| 4,048,745 | A | * | 9/1977 | Morford | 43/69 |
| 4,255,202 | A | * | 3/1981 | Swan, Jr. | 106/122 |
| 4,342,403 | A | * | 8/1982 | Badtke et al. | 220/350 |
| 4,561,544 | A | * | 12/1985 | Reeve | 206/540 |
| 4,787,382 | A | * | 11/1988 | Pekovic | 128/203.25 |
| 5,299,380 | A | * | 4/1994 | Fornal, Sr. | 43/66 |

(Continued)

OTHER PUBLICATIONS

International Search Report of PCT/KR2007/001222 mailed Jun. 18, 2007.

*Primary Examiner* — David Parsley
(74) *Attorney, Agent, or Firm* — Morris, Manning & Martin, LLP; Juan Carlos A. Marquez

(57) ABSTRACT

A movement analysis device for rodents capable of variably adjusting a space where a rodent is placed in order to stimulate the behavior of the rodent so that motor functions of the rodent can be analyzed more effectively. The movement analysis device for rodents includes a body including a pair of side plates distanced from each other with a predetermined gap and a connector plate connecting one ends of the side plates together, the connector plate having a slit extending from one to the other one of the side plates; and an adjustment unit including an adjustment plate configured insertable between the side plates of the body and into the slit of the connector plate of the body and a support plate extending to a height reaching from a bottom to the slit to support the adjustment plate at one portion thereof. The support plate is semi-cylindrically shaped to form a cylindrical space together with the connector plate.

6 Claims, 4 Drawing Sheets

(56) References Cited

U.S. PATENT DOCUMENTS

| | | | |
|---|---|---|---|
| 5,380,232 A | * | 1/1995 | Berggreen et al. .............. 446/75 |
| 5,471,781 A | * | 12/1995 | Vine ................................. 43/69 |
| 6,168,038 B1 | * | 1/2001 | Fischer ........................ 220/4.01 |
| 6,386,359 B2 | * | 5/2002 | Ahlberg ........................ 206/225 |
| 6,651,587 B1 | | 11/2003 | DeFord et al. |
| 6,880,487 B2 | | 4/2005 | Reinkensmeyer et al. |
| 2007/0095296 A1 | * | 5/2007 | Zuccaro ........................ 119/61.5 |

* cited by examiner

*Prior Art*

MOVEMENT ANALYSIS DEVICE FOR RODENTS

TECHNICAL FIELD

The present invention relates to a movement analysis device for rodents, and more particularly, to a movement analysis device capable of variably adjusting a space where a rodent is placed in order to stimulate the behavior of the rodent so that motor functions of the rodent can be analyzed more effectively.

BACKGROUND ART

A cylinder test using a rodent is carried out to measure motor functions of the rodent based on the fact that the rodent cannot tread on the wall properly owing to degraded motor function of a damaged body part.

A conventional cylinder test uses a transparent plastic cylinder with a diameter of 20 cm and a height of 45 cm to measure motor functions of a rodent. The test is carried out by counting whenever the rodent treads on the wall of the cylinder with front legs at damaged and normal sides and then applying the counted numbers into the formula $(B+C)/(A+B+2C)$ or $(B-C)/(A+B+C)$ in order to produce a numerical value, where A is the counted number at the damaged side, B is the counted number at the normal side, and C is the total.

To carry out such an experiment, a device as shown in FIG. 5 has been used. Referring to FIG. 5, a rodent 1 is placed into a cylinder 100 mounted on a base 102 in order to measure motor functions of the rodent 1. The device is devised to measure changes in the behavior of the rodent, that is, whether or not the rodent actively treads on the wall of the cylinder based on the fact that a rodent damaged in the right brain shows degraded motor functions in the left legs. However, the conventional device thoroughly relies on the changes in the behavior of the rodent and thus needs a long term experiment. In addition, individual rodents may create a number of variables. For example, during the experiment, some rodents may not move actively even with the normal leg owing to fatigue.

Accordingly, studies have been made to devise a device capable of causing changes in the behavior of a rodent by stimulating it to move more actively.

DISCLOSURE OF INVENTION

Technical Problem

The present invention has thus been made to solve the aforementioned problems with the prior art, and an object of the present invention is to provide a movement analysis device for rodents which is configured to adjust a space where a rodent is placed in order to cause active changes in the behavior of the rodent.

Another object of the present invention is to stimulate the movement of rodents using the same movement analysis device in order to shorten experiment time and obtain proper experiment results irrespective of individual variations of rodents.

Technical Solution

To realize at least one of the aforementioned aspects, the present invention provides a movement analysis device for rodents which includes a body including a pair of side plates distanced from each other with a predetermined gap and a connector plate connecting one ends of the side plates together, the connector plate having a slit extending from one to the other one of the side plates; and an adjustment unit including an adjustment plate configured insertable between the side plates of the body and into the slit of the connector plate of the body and a support plate extending to a height reaching from a bottom to the slit to support the adjustment plate at one portion thereof, the support plate semicylindrically shaped to form a cylindrical space together with the connector plate.

Preferably, each of the adjustment plate and the support plate of the adjustment unit may have a width substantially equal with the gap between the side plates of the body, and the body and the adjustment unit may be made of a transparent resin. More preferably, the movement analysis device may further include a gate in one of the side plates of the body, the gate being openable to allow a rodent to be placed into a space of the device.

Furthermore, the movement analysis device may further include a guide bar provided on an inner surface of the side plates of the body to guide the adjustment plate which moves forward/backward through the slit, the guide bar configured to contact top portions of longitudinal edges of the adjustment plate. Preferably, the adjustment plate may further include a backing plate connected to a bottom of the support plate, the backing plate contacting a base at a preset area to allow the adjustment plate to move in a posture vertical with respect to the base.

Advantageous Effects

According to the movement analysis device for rodents of the invention, a space where a rodent is placed can be adjusted in order to cause active changes in the behavior of the rodent.

Furthermore, the present invention can stimulate the movement of rodents using the same movement analysis device in order to shorten experiment time and obtain proper experiment results irrespective of individual variations of rodents.

<Major Reference Numerals of the Drawings>

| | |
|---|---|
| 1: rodent | 11: base plate |
| 12: connector plate | 13: side plate |
| 15: guide bar | 20: door |
| 32: adjustment plate | 35: support plate |
| 37: backing plate | |

BEST MODE FOR CARRYING OUT THE INVENTION

Hereinafter preferred embodiments of the invention will be described in more detail with reference to the accompanying drawings.

Figure 1:
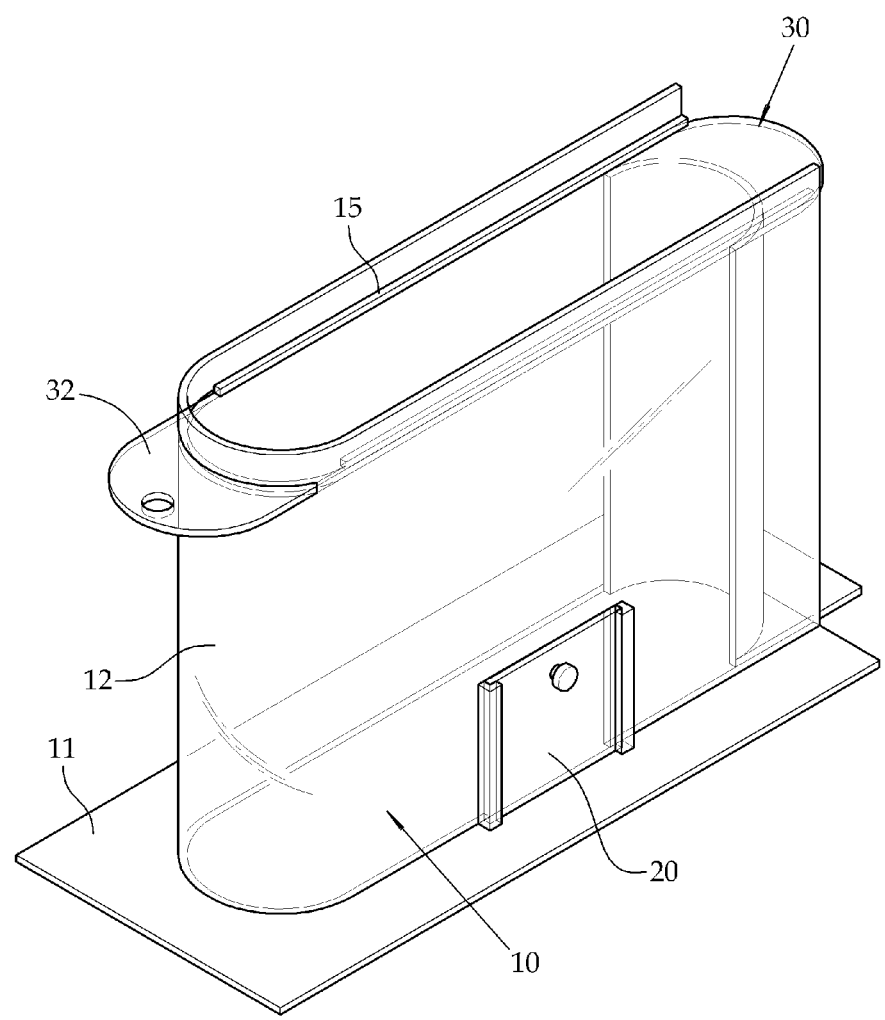
FIG. 1 is a perspective view illustrating a movement analysis device for rodents of the invention.

FIG. 1 is a perspective view illustrating a movement analysis device for rodents of the invention. The movement analysis device for rodents of the invention includes a body 10 and an adjustment unit 30 inserted into the body 10 to define a cylindrical space.

Figure 2:
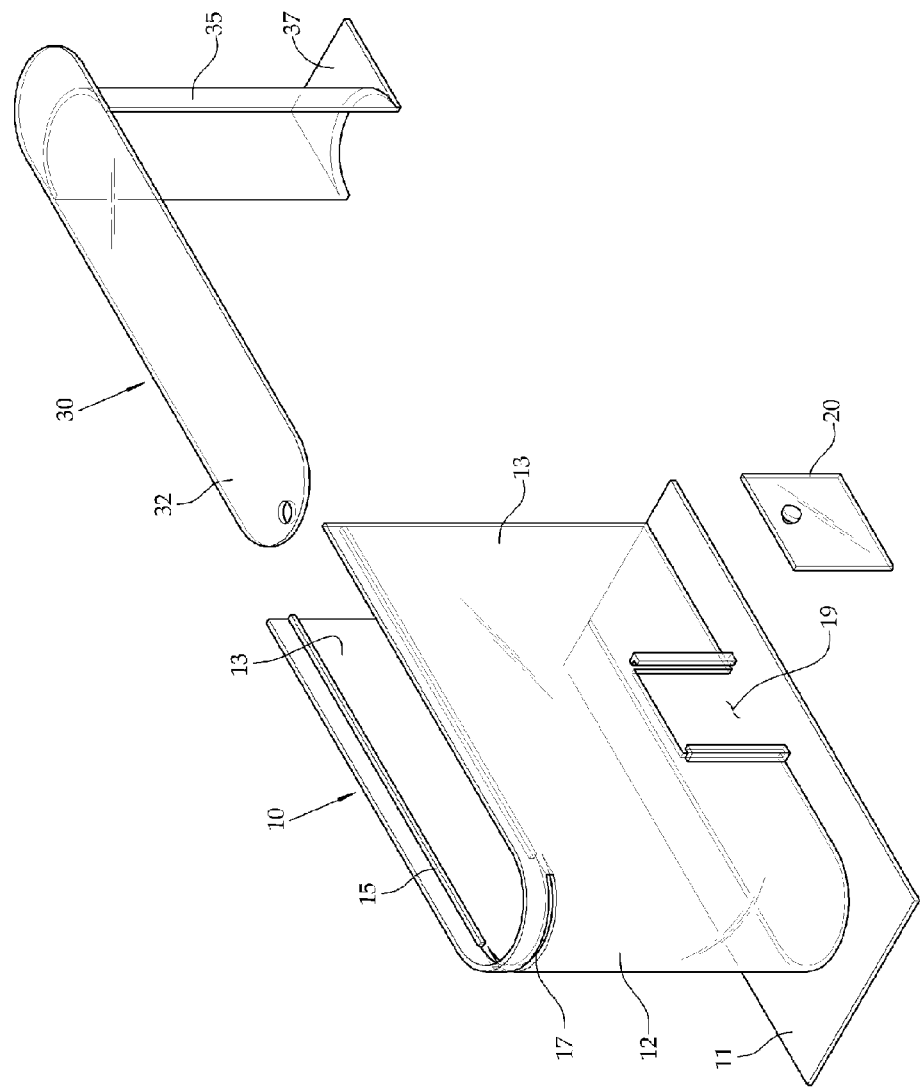
FIG. 2 is an exploded perspective view illustrating the movement analysis device for rodents of the invention.

The body 10 includes a pair of side plates 13 and a connector plate 12 connecting the side plates 13. The side plates 13 are rectangular transparent plates which are distanced from each other in parallel. The side plates 13 are connected together at one ends by the connector plate 12 to produce a semicylindrical structure but opened at the other ends as shown in FIG. 2. It is preferable that all of the side plates 13 and the connector plate 12 are formed integrally on a single base plate 11.

As shown in FIG. 2, a slit 17 is formed on an upper part of the connector plate 12 of the body 10. The slit 17 is extended from the side plate 13 at one side to the side plate 13 to the other side, with a suitable size so that an adjustment plate 32 which is fitted between the side plates 13 can be inserted through the slit 17.

The adjustment plate 32 of the adjustment unit 30 is inserted into the body 10 configured as above. The adjustment unit 30 includes a support plate 35 together with the adjustment plate 32. The adjustment plate 32 has a width the same as the distance between the side plates 13 so that the adjustment plate 32 can be inserted between the side plates 13. It is preferable that the adjustment plate 32 has a predetermined length so that a portion of the adjustment plate 32 can protrude out of the slit 12 when inserted into the slit 17 through the side plates 13. The portion of the adjustment plate 32 protruding out of the slit 17 also acts as a grip by which a user can move the adjustment plate 32 forward and backward with respect to the slit 30. Alternatively, the adjustment plate may be provided at one end with a hole so that a separate grip can be connected with the hole.

The adjustment plate 32 is slid and inserted between top portions of the both side plates 13 into a position parallel with the same, and the support plate 35 is attached to a portion of the adjustment plate 32 and extended to a preset height from the bottom in order to hold the adjustment plate 32 in the inserted position. The support plate 35 is extended to the height reaching from the bottom to the slit 17 so that the adjustment plate 32 can be inserted horizontally into the slit 17. The support plate 35 is also semicylindrically shaped so as to make a cylindrical inner space together with the connector plate 12 of the body 10. The width of the support plate 35 is also determined with such a size that the support plate 35 can be inserted between the side plates 13, and preferably, with the same size as that of the adjustment plate 32.

The adjustment unit 30 further includes a backing plate 37 connected to the bottom of the support plate 35. The backing plate 37 has a preset area contacting the base plate so that the adjustment plate 32 can horizontally enter and exit the slit 17.

In addition, an openable gate is formed in one of the side plates 13 of the body 10 through which rodents can be placed into the cylindrical inner space. The gate is made by forming an opening 19 in the side plate 13 and mounting a sliding door 20 on the opening 19 so that the door 20 can open/close the opening by sliding.

Guide bars 15 are installed inside the side plates 13 of the body 10 to guide forward/backward movement of the adjustment plate 32 of the adjustment unit 30. The guide bars 15 guide the adjustment plate 32 to be correctly inserted into the slit 17. The guide bars 15 may be formed preferably in contact with top portions of longitudinal edges of the adjustment plate 32.

Figure 3:
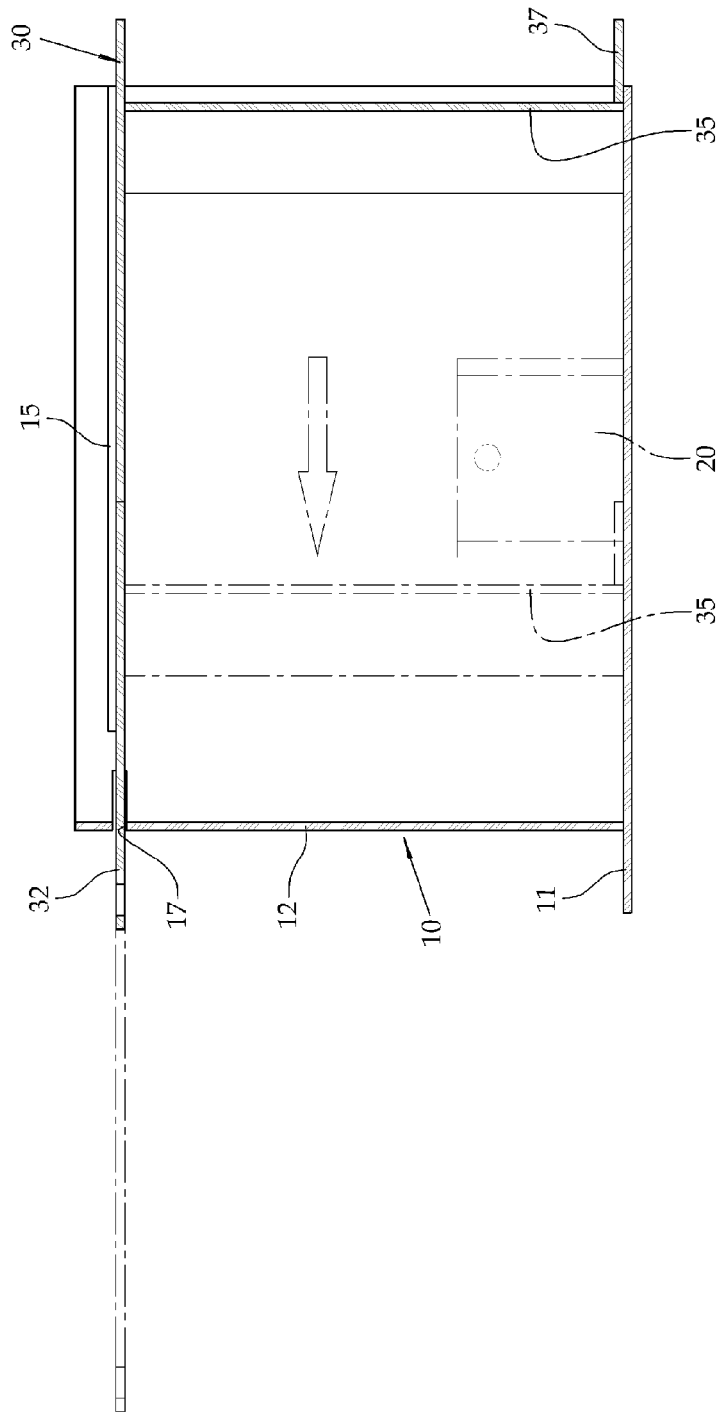
FIG. 3 is a side sectional view illustrating the movement analysis device for rodents shown in FIG. 1.
Figure 4:
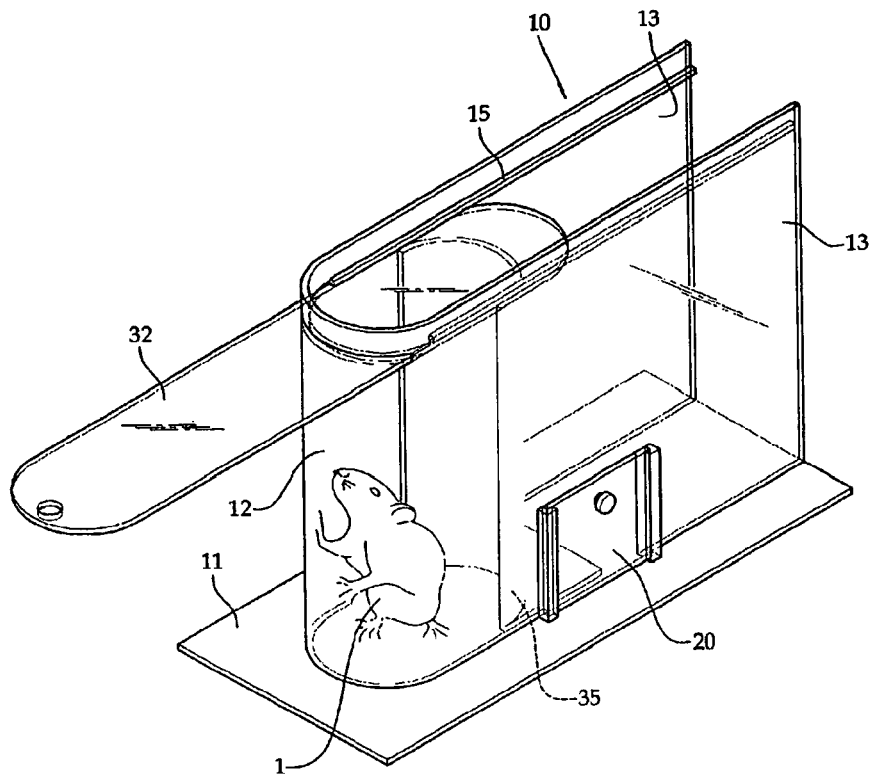
FIG. 4 is a perspective view illustrating a usage of the movement analysis device for rodents of the invention.
Figure 5:
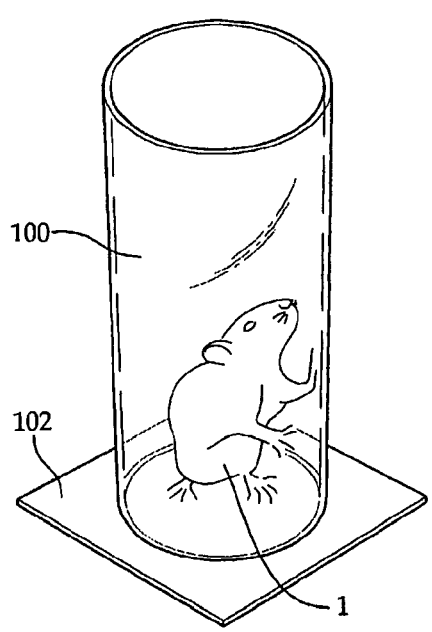
FIG. 5 a perspective view illustrating a conventional movement analysis device for rodents.

FIGS. 3 and 4 illustrate an operation of the movement analysis device for rodents of the invention. As shown in FIG. 3, the adjustment plate 32 inserted into the slit 17 of the connector plate 12 can be moved forward/backward to adjust the distance between the connector plate 12 and the support plate 35.

FIG. 4 shows a rodent 1 placed into the device. After placing the rodent into the device through the gate, the adjustment plate 32 is moved forward to adjust the cylindrical inner space of the device defined by the connector plate 12 and the support plate 35. Since the rodent 1 should be made to maintain a standing posture, the inner space is formed with a substantially circular cross section.

The width of the inner space is adjusted by the adjustment plate 32 in order to make the rodent move continuously. If the rodent 1 does not move actively, the inner space may be reduced so that the rodent takes a more upright posture with respect to the inside wall. On the other hand, the inner space may be increased so that the rodent can takes a slanting posture with respect to the inside wall.

The invention claimed is:

1. A movement analysis device for rodents comprising:
a body including a base plate, a pair of side plates distanced from each other with a pre-determined gap, and a connector plate connecting one ends of the side plates together and having a slit extending from one to the other one of the side plates, the side plates and the connector plate formed on the base plate; and
an adjustment unit including an adjustment plate configured insertable between the side plates of the body and into the slit of the connector plate of the body and a support plate extending to a height reaching from a bottom to the slit to support the adjustment plate at one portion thereof, the support plate semicylindrically shaped to form an adjustably cylindrical space together with the connector plate when the adjustment unit is movably inserted into the body, wherein the adjustment plate inserted into the slit of the connector plate movable forward or backward to adjust a distance between the connector plate and the support plate, while maintaining an inner space to be enclosed with the base plate, the side plates, the connector plate, the adjustment plate and the support plate, thus stimulating behavior of a rodent placed temporarily in the inner space.

2. The movement analysis device according to claim 1, wherein each of the adjustment plate and the support plate of the adjustment unit has a width substantially equal with the gap between the side plates of the body.

3. The movement analysis device according to claim 1, wherein the body and the adjustment unit are made of a transparent resin.

4. The movement analysis device according to claim 1, further comprising a gate in one of the side plates of the body, the gate being openable to allow a rodent to be placed into a space of the device.

5. The movement analysis device according to claim 1, further comprising a guide bar provided on an inner surface of the side plates of the body to guide the adjustment plate which moves forward/backward through the slit, the guide bar configured to contact top portions of longitudinal edges of the adjustment plate.

6. The movement analysis device according to claim 1, wherein the adjustment plate further includes a backing plate connected to a bottom of the support plate, the backing plate contacting the base plate at a preset area to allow the adjustment plate to move in a posture vertical with respect to the base plate.

* * * * *